United States Patent
Langenbeck

(10) Patent No.: US 10,814,541 B2
(45) Date of Patent: Oct. 27, 2020

(54) CONTINUOUSLY EXTRUDED UNITARY BLANK (CUBE) PALLET AND METHOD OF MAKING

(71) Applicant: Keith A Langenbeck, Pleasant View, TN (US)

(72) Inventor: Keith A Langenbeck, Pleasant View, TN (US)

( * ) Notice: Subject to any disclaimer, the term of this patent is extended or adjusted under 35 U.S.C. 154(b) by 0 days.

(21) Appl. No.: 16/398,160

(22) Filed: Apr. 29, 2019

(65) Prior Publication Data

US 2019/0329473 A1 Oct. 31, 2019

Related U.S. Application Data

(60) Provisional application No. 62/663,309, filed on Apr. 27, 2018.

(51) Int. Cl.
| | |
|---|---|
| *B29C 48/00* | (2019.01) |
| *B29C 44/20* | (2006.01) |
| *B29C 48/11* | (2019.01) |
| *B65D 19/04* | (2006.01) |
| *B29K 105/04* | (2006.01) |
| *B29L 31/00* | (2006.01) |
| *B29K 25/00* | (2006.01) |

(52) U.S. Cl.
CPC .......... *B29C 48/0022* (2019.02); *B29C 44/20* (2013.01); *B29C 48/022* (2019.02); *B29C 48/11* (2019.02); *B65D 19/04* (2013.01); *B29C 2793/009* (2013.01); *B29K 2025/06* (2013.01); *B29K 2105/046* (2013.01); *B29L 2031/7178* (2013.01); *B65D 2519/00034* (2013.01); *B65D 2519/00069* (2013.01); *B65D 2519/00268* (2013.01); *B65D 2519/00781* (2013.01); *B65D 2519/00796* (2013.01)

(58) Field of Classification Search
CPC .......... B65D 19/06; B65D 2519/00273; B65D 2519/00034; B65D 2519/00069; B65D 2519/00104; B65D 2519/00268
USPC ...................... 108/57.25, 57.26, 57.27, 27.28
See application file for complete search history.

(56) References Cited

U.S. PATENT DOCUMENTS

| | | | | |
|---|---|---|---|---|
| 3,511,191 A | * | 5/1970 | Verdi ..................... | B29C 44/445 |
| | | | | 108/57.28 |
| 3,677,200 A | * | 7/1972 | Coccagna .......... | B65D 19/0038 |
| | | | | 108/53.5 |
| 3,719,157 A | * | 3/1973 | Arcocha ............... | B65D 19/004 |
| | | | | 108/57.25 |

(Continued)

*Primary Examiner* — Jose V Chen
(74) *Attorney, Agent, or Firm* — Lyman Moulton, Esq.; Moulton Patents, PLLC.

(57) ABSTRACT

A continuously extruded unitary blank (CUBE) has a top, a bottom, two sides and at least one webbing there between parallel to the two sides. The CUBE has a front cut end and a rear cut end which define two open face channels to accommodate the forks of a fork lift and pallet jack. Two spaces are manufactured in the two sides and in the at least one webbing to accept a lateral insertion and a lateral removal of the forks. Chamfers are manufactured in edges of the cutouts to facilitate the insertion and the removal of the forks from the pallet. Chamfers are also manufactured in the front and rear cut ends to facilitate accommodation of the forks. Voids are manufactured in the bottom to allow pallet jack wheels to pass into the pallet and rest on a surface for a lifting of the pallet from the surface.

19 Claims, 10 Drawing Sheets

(56) References Cited

U.S. PATENT DOCUMENTS

| | | | | |
|---|---|---|---|---|
| 3,720,176 | A * | 3/1973 | Munroe | B65D 19/0051 |
| | | | | 108/57.25 |
| 3,814,031 | A * | 6/1974 | Fowler | B65D 19/004 |
| | | | | 108/57.28 |
| 4,051,787 | A * | 10/1977 | Nishitani | B65D 19/0012 |
| | | | | 108/55.3 |
| 4,397,246 | A * | 8/1983 | Ishida | B65D 19/0012 |
| | | | | 108/55.3 |
| 4,966,083 | A * | 10/1990 | Cerugeira | B65D 19/0016 |
| | | | | 108/57.27 |
| 5,476,048 | A * | 12/1995 | Yamashita | B65D 19/0012 |
| | | | | 108/57.28 |
| 5,687,652 | A * | 11/1997 | Ruma | B65D 19/0026 |
| | | | | 108/57.25 |
| 6,263,807 | B1 * | 7/2001 | Fox | B65D 19/0073 |
| | | | | 108/54.1 |
| 6,508,182 | B1 * | 1/2003 | Smorgan | B29C 45/26 |
| | | | | 108/57.25 |
| 6,659,020 | B1 * | 12/2003 | Ball | B29C 53/22 |
| | | | | 108/57.28 |
| 6,758,148 | B2 * | 7/2004 | Torrey | B65D 19/0004 |
| | | | | 108/51.11 |
| 6,938,321 | B2 * | 9/2005 | Hentges | B65D 19/0008 |
| | | | | 108/57.28 |
| 7,169,341 | B2 | 1/2007 | Bruck et al. | |
| 8,181,580 | B2 * | 5/2012 | Roth | B65D 19/0073 |
| | | | | 108/57.25 |
| 8,397,649 | B2 | 3/2013 | Smith et al. | |
| 9,327,873 | B2 * | 5/2016 | Frankenberg | B65D 19/38 |
| 9,889,587 | B2 * | 2/2018 | Ni | B29C 45/0001 |
| 2003/0136315 | A1 | 7/2003 | Kim | |
| 2004/0159267 | A1 * | 8/2004 | Markling | B29C 49/20 |
| | | | | 108/57.25 |
| 2006/0243175 | A1 * | 11/2006 | Dummett | B29C 44/569 |
| | | | | 108/57.28 |
| 2007/0137533 | A1 * | 6/2007 | Carson | B65D 19/0038 |
| | | | | 108/57.28 |
| 2007/0204768 | A1 * | 9/2007 | Li | B29C 45/1634 |
| | | | | 108/57.25 |
| 2009/0183655 | A1 * | 7/2009 | Ogburn | B65D 19/0016 |
| | | | | 108/57.25 |
| 2010/0043678 | A1 * | 2/2010 | Linares | B32B 3/12 |
| | | | | 108/57.25 |
| 2014/0096708 | A1 * | 4/2014 | Pherson | B65D 88/14 |
| | | | | 108/56.3 |

\* cited by examiner

CONTINUOUSLY EXTRUDED UNITARY BLANK (CUBE) PALLET AND METHOD OF MAKING

CROSS-REFERENCE TO RELATED APPLICATION

This application claims the benefit of the priority date of earlier filed U.S. Provisional Patent Application Ser. No. 62/663,309 titled 'Foamed Monobloc Pallet' filed Apr. 27, 2018 by Keith A. Langenbeck, and is incorporated herein by reference in its entirety.

BACKGROUND OF THE INVENTION

Consumer, commercial and industrial goods commonly use shipping or transportation pallets to move products to market. Different countries and industries employ different physical size pallets. Different designs use various materials in their construction. Wood is the dominate material of construction worldwide and the plank and stringer style is the most common design.

The number of pallets in the US is enormous with an estimated 2 billion units in circulation and approximately 400 million new wooden ones built and sold annually. Indicative of their importance and ubiquity, it is reported that up to 80% of the US Gross Domestic Product moves on pallets to market. Plastic pallets of various designs and manufacturing techniques are well known but typically are more expensive than wood, have operational issues/drawbacks and represent only about 2% market share primarily due to high purchase price.

Metal pallets are more rare than plastic, more expensive than plastic and tightly recirculated within in closed loop distribution networks. Wood pallets are readily available and have the lowest purchase price. Most wood pallets are considered one-way from the initial point of use and the cost is accounted for in total packaging and shipping costs of the product.

SUMMARY OF THE INVENTION

A pallet as disclosed, accommodates forks of a fork lift and forks and wheels of a pallet jack for a movement of the pallet on a surface. The pallet includes a continuously extruded unitary blank (CUBE) comprising a top, a bottom, two sides and at least one webbing there between parallel to the two sides for joining the top and the bottom. Perpendicular to the two sides and to the at least one webbing, the CUBE has a front cut end and a rear cut end which define two open face channels therein to accommodate the forks. Two spaces are manufactured in the two sides and in the at least one webbing to accept a lateral insertion and a lateral removal of the forklift forks and the pallet jack forks and wheels from the pallet. Chamfers are manufactured in edges of the cutouts to facilitate the insertion and the removal of the forks from the pallet. Chamfers are also manufactured in the front cut end and in the rear cut ends to facilitate the accommodation of the forks. Voids are manufactured in the bottom to allow the wheels of the forks to pass into the pallet and rest on the surface for the movement of the pallet from a lifting of the pallet from the surface via the pallet jack wheels and forks. CUBE surfaces and geometries are reduced by processing to form a finished pallet.

A method of making the disclosed pallet includes continuously extruding a unitary blank (CUBE) comprising a top, a bottom, two sides and at least one webbing there between parallel to the two sides and joining the top and the bottom. The method also includes cutting the CUBE perpendicular to the two sides and to the at least one webbing to define two open face channels in a front cut end and in a rear cut end of the CUBE to accommodate the forks. The method additionally includes opening a first CUBE front end extrusion and closing a last CUBE rear end extrusion for an n number of CUBES and an n-1 number of cuts. The method further includes cutting the CUBE to a predetermined length 'on the fly,' with no interruption or change to a constant speed of the CUBE as it leaves an extruder. The method yet includes reducing CUBE surfaces and geometries to form a finished pallet.

Other aspects and advantages of embodiments of the disclosure will become apparent from the following detailed description, taken in conjunction with the accompanying drawings, illustrated by way of example of the principles of the disclosure.

Figure 1:
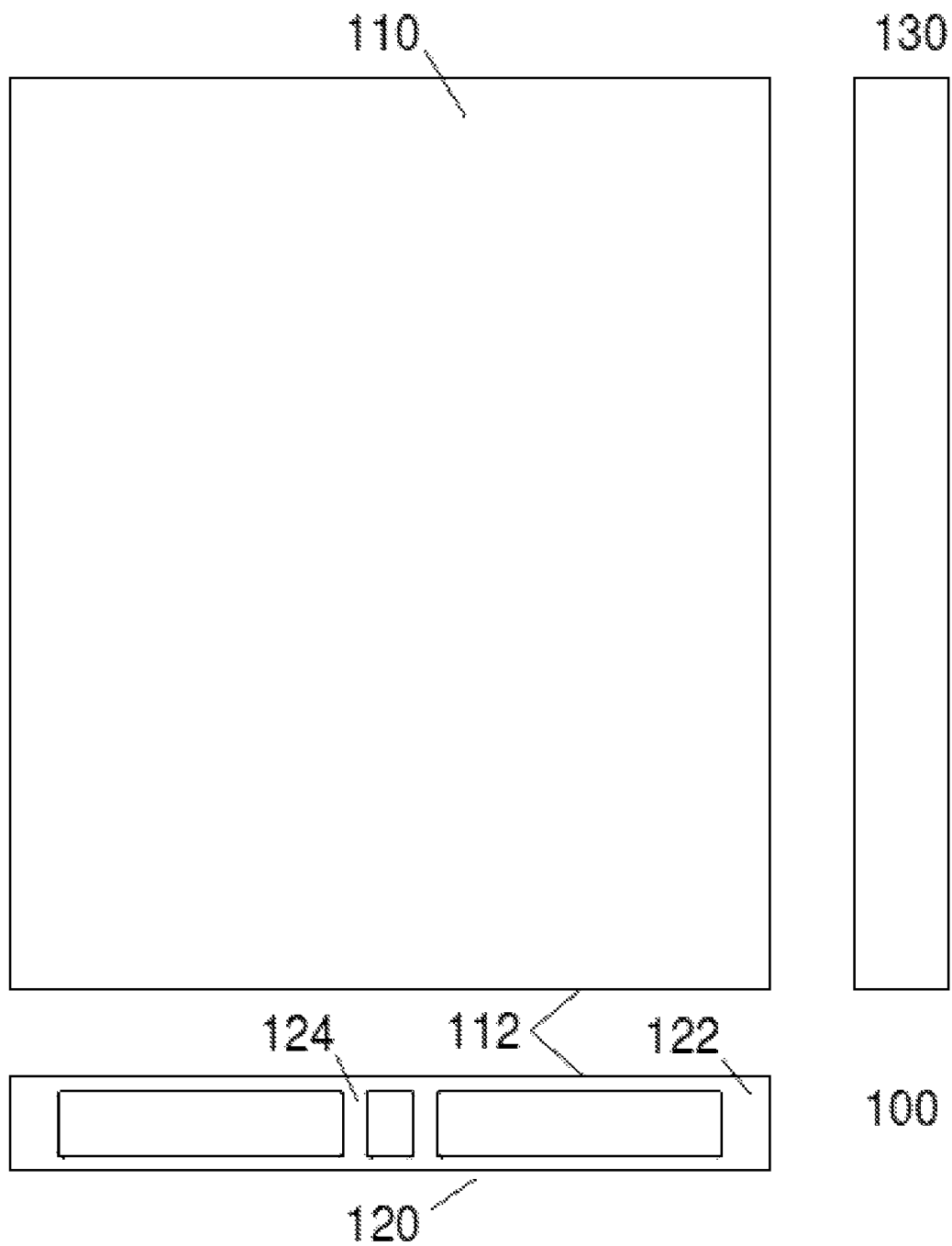
FIG. 1 illustrates a polymer foam, extruded profile, pallet blank 100 with top 110 and bottom 120 surfaces or decks and solid sides 130 in accordance with an embodiment of the disclosure.

Throughout the description, similar or same reference numbers may be used to identify similar or same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

This application discloses a new shipping pallet produced from a unique polymer foam that is continuously extruded into a monolithic profile. This polymer foam material is not like structural foam injection molding or EPS (Expanding PolyStyrene) bead foam molding. The extruded foam pallet has a closed cell structure with shared common walls between adjacent cells. This is different than separate individual cell walls being in contact with numerous other separate adjacent cell walls as in EPS bead molding.

As the profile exits the extruder, it is cut into uniform lengths or blanks. After which these blanks are machined to create 'bottom boards', openings on the bottom, openings on the side and other details resulting in a mono block or monolithic pallet produced from a single, unitary extrusion blank. Like the bottom, the top deck also has holes or openings machined for various reasons or functions.

This design and manufacturing method results in a pallet with no uniform grain structure, no seam lines, no shear planes or stress concentration points, requiring no fasteners at all, weighs about 80% less than wood pallets of the same dimensions, is weather and chemical resistant, impervious to biological or insect contamination, priced competitively with single trip wood pallets like the Grocery Manufacturer's Association 48×40 common pallet, lasts many times longer than wood pallets and is 100% recyclable.

The top and bottom decks of the extrusion blank are typically the same until either is machined, differentiating one from the other. Four-way plastic pallets of similar shape are known from injection molding but are typically comprised of separate top and bottom halves that are fastened or adhered together. Extrusion foam molding followed by machining operations produces superior characteristics unknown in conventional production methods for plastic pallets. Extrusion foam molding results in greatly reduced weight and cost versus injection molded plastic pallets.

FIG. 1 illustrates a polymer foam, extruded profile, pallet blank 100 with top 110 and bottom 120 surfaces or decks and solid sides 130 in accordance with an embodiment of the disclosure. The leading edge or face 112 of pallet blank 100 is also identified. Pallet blank 100 has four vertical members between the upper and lower decks. There are two vertical members 122 on the outside faces or sides of the pallet blank 100 that run parallel to the major axis. Two interior vertical members 124 are symmetrically located and parallel to the outside vertical members 122 and the major axis of the pallet blank 100. Vertical members 124 could be greater in count than two or a single member. The top 110 and bottom 120 decks of pallet blank 100 are shown as the same, indistinguishable one from the other, but could be different in thickness. Although not shown in this figure, the exterior and interior surfaces of 110 and 120 could have certain ribs created in the extrusion process.

Figure 2:
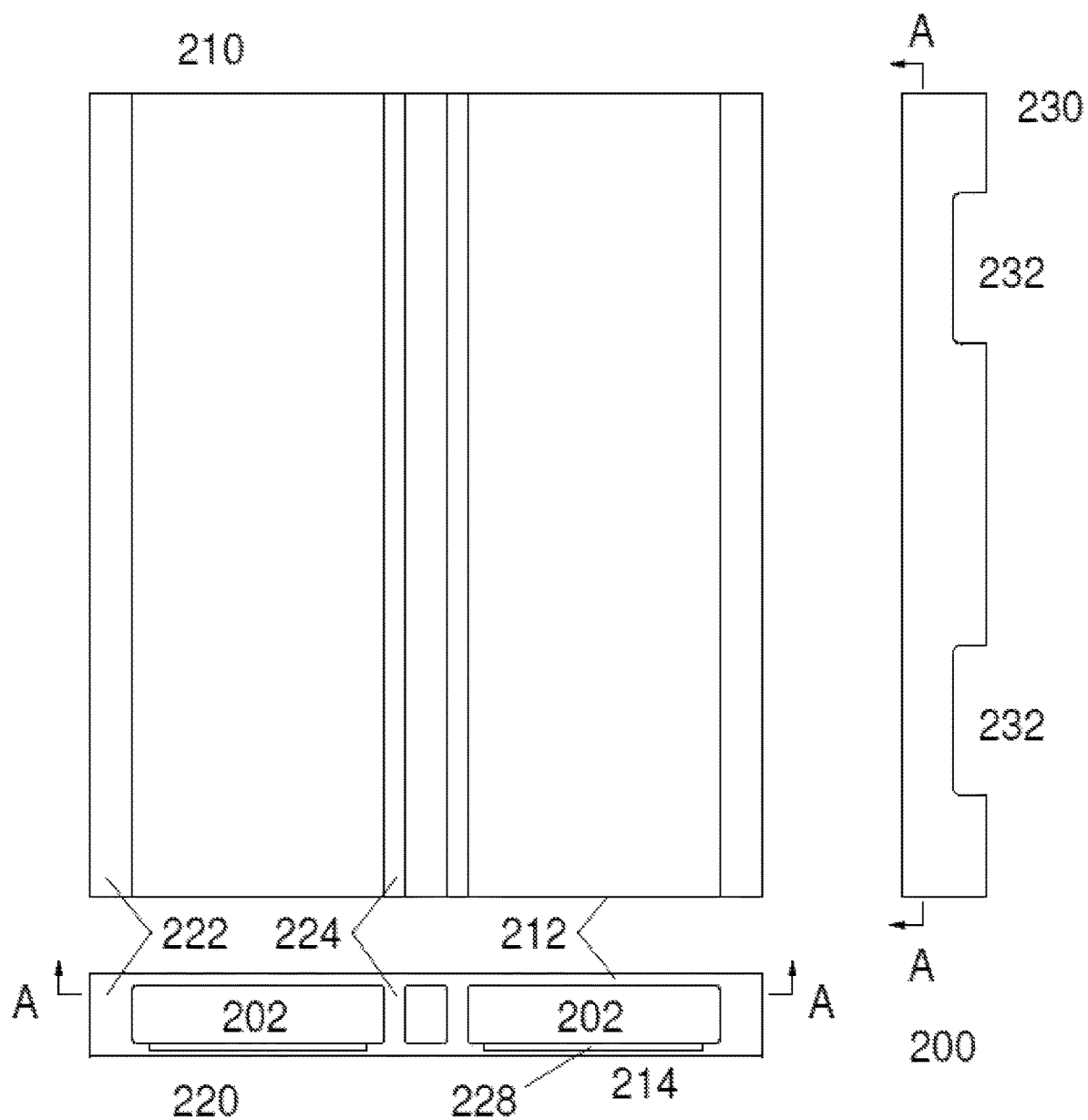
FIG. 2 illustrates pallet 200 after the pallet blank 100 has been machined into its finished shape in accordance with an embodiment of the disclosure.

FIG. 2 illustrates pallet 200 after the pallet blank 100 has been machined into its finished shape in accordance with an embodiment of the disclosure. Section view A-A of side 230 and end 220 of pallet 200 reveal upper interior details of pallet 200 after it has been machined. Section A-A is located above the cut outs 232 as seen in the side view 230 and below the top deck 210 as seen in the end view 220. Cut outs 232 are fully through both vertical side members 222 and both vertical interior members 224. Cut outs 232 allow fork lift and pallet jack access from the side, fully across the width of the pallet and perpendicular to the major axis. The upper leading edge or face 212 of pallet 200 is differentiated from the bottom leading edge. Bottom boards 214 have chamfers 228 to facilitate insertion of wheeled pallet jacks into the vertical spaces or voids 202 between the top deck and bottom boards. Fork lifts also would use vertical spaces or voids 202 for lifting pallet 200.

Figure 3:
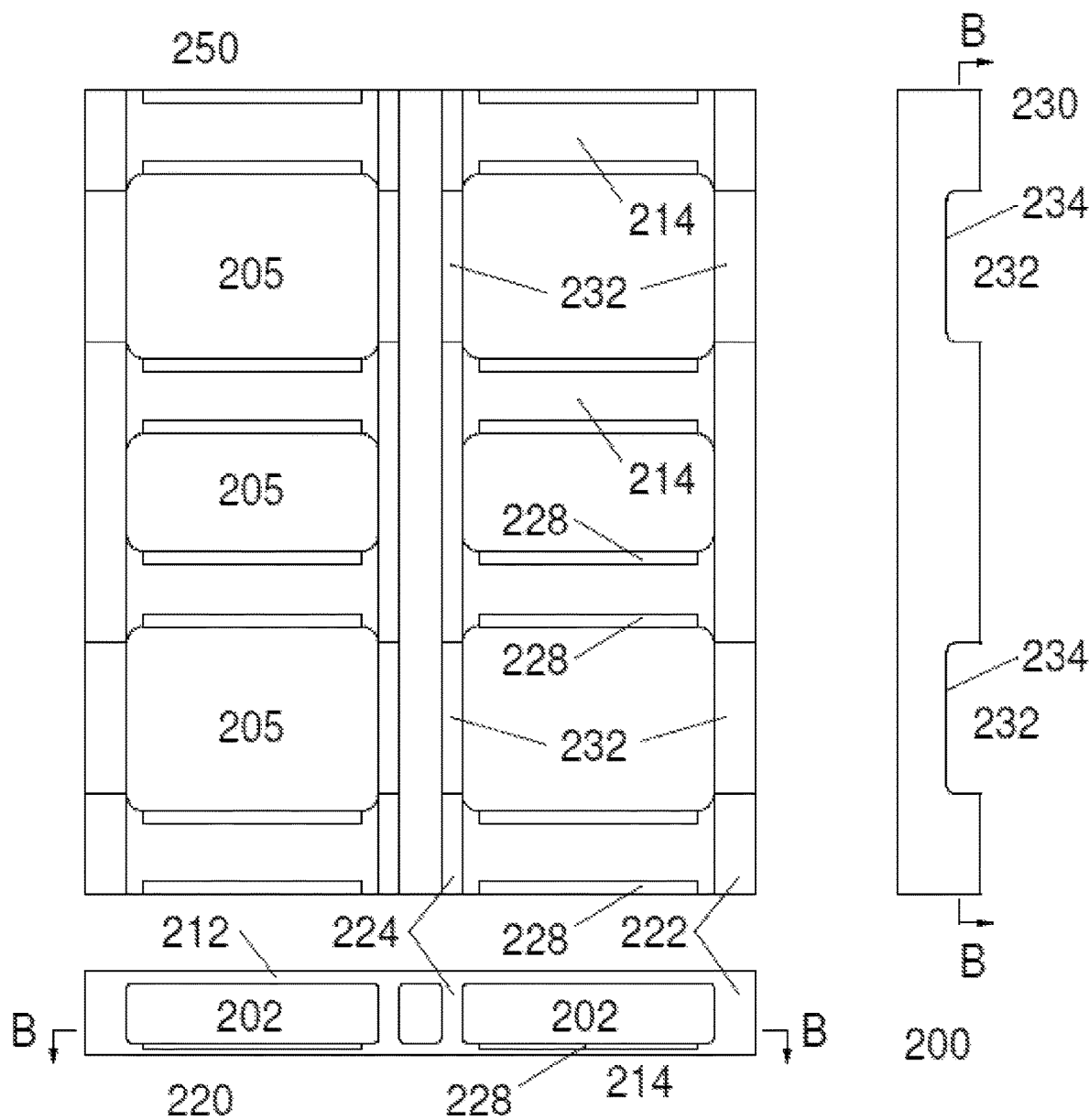
FIG. 3 illustrates pallet 200 after the pallet blank 100 has been machined into the finished shape in accordance with an embodiment of the disclosure.

FIG. 3 illustrates pallet 200 after the pallet blank 100 has been machined into the finished shape in accordance with an embodiment of the disclosure. Section view B-B of the side 230 and end 220 of the finished pallet 200 reveals lower interior details and voids 205 of the pallet bottom 250 after it has been machined. Section B-B is vertically located beneath the upper surface 234 of cut outs 232 as seen in the side view 230 and above the bottom boards 214, which have been cut out from the lower deck of the pallet blank 100. Cut outs 232 are fully through both side vertical members 222 and both interior vertical members 224. Cut outs 232 allow fork and pallet jack access from the side, fully across the width of the pallet and perpendicular to the major axis. The lower boards 214 are differentiated from the solid upper deck 212. Bottom boards 214 have chamfers 228 on the leading and trailing edges to facilitate insertion of wheeled pallet jacks into the vertical spaces or voids 202 between the top deck and bottom boards. Fork lifts also use vertical spaces or voids 202 for lifting pallet 200. Lower spaces or voids 205 between boards 214 allow for pallet jack wheels to rest on the ground or surface for lifting the pallet 200 off the ground or surface on which it rests.

Figure 4:
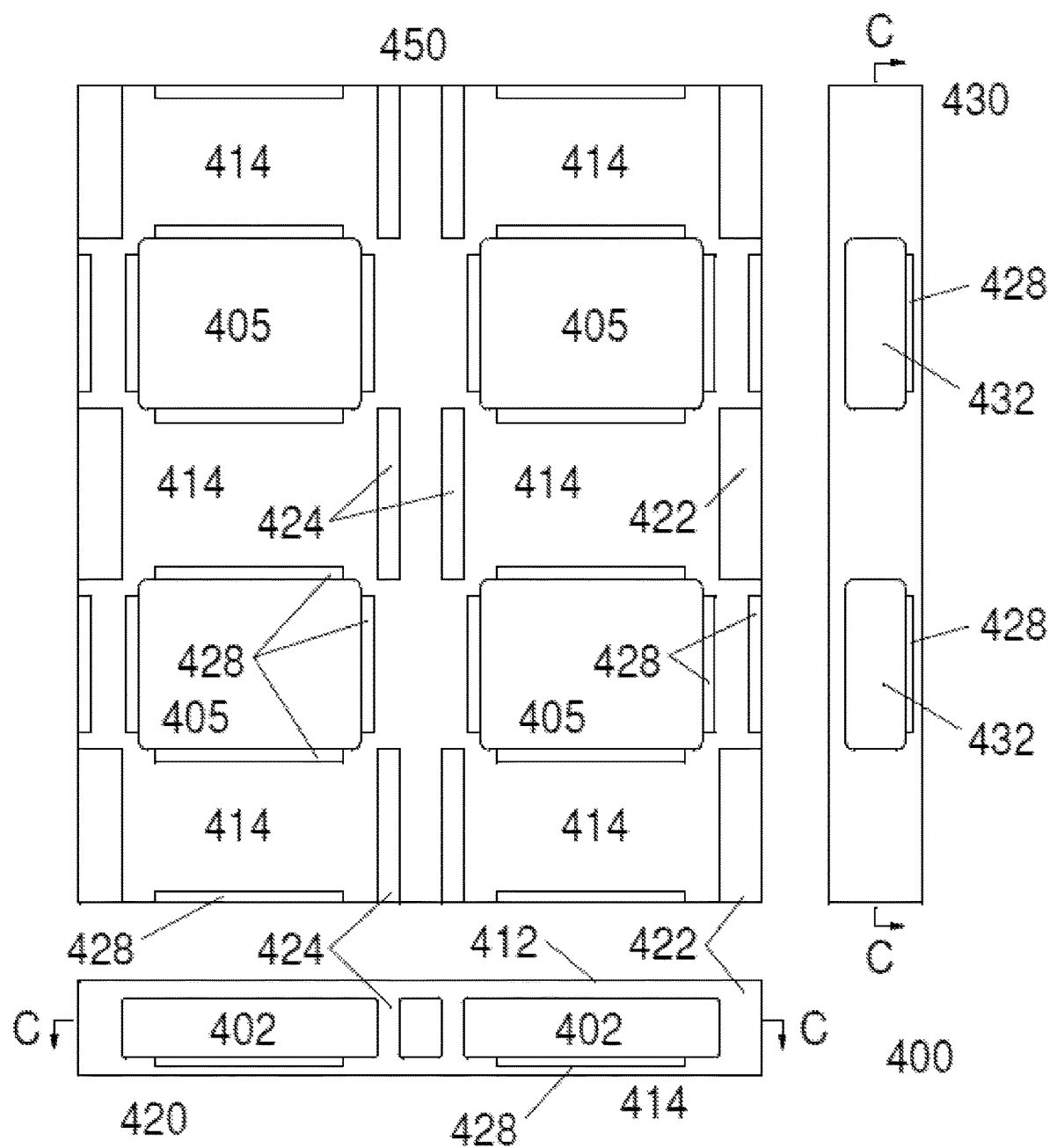
FIG. 4 illustrates pallet 400 after the pallet blank 100 has been machined into the finished shape in accordance with an embodiment of the disclosure.

FIG. 4 illustrates pallet 400 after the pallet blank 100 has been machined into the finished shape in accordance with an embodiment of the disclosure. Section C-C of the side 430 and end 420 of the finished pallet 400 reveals lower interior details and voids 405 of the pallet bottom 450 after it has been machined. Section B-B is vertically located at the vertical mid-plane of pallet 400 and between the upper and lower surfaces of holes 432. Holes 432 are fully through both side vertical members 422 and both interior vertical members 424. Holes 432 allow fork lift and pallet jack access from the side, fully across the width of the pallet and perpendicular to the major axis. The lower boards 414, are differentiated from the solid upper deck 412. Bottom boards 414 have chamfers 428 on the leading and trailing edges to facilitate insertion of wheeled pallet jacks into the vertical spaces or voids 402 and 432 between the top deck and bottom boards. Fork lifts also use vertical spaces or voids 402 and 432 for lifting pallet 400. Lower spaces or voids 405 between boards 414 allow for pallet jack wheels to rest on the ground or surface for lifting the pallet 400 off the ground or surface on which it rests.

Figure 5:
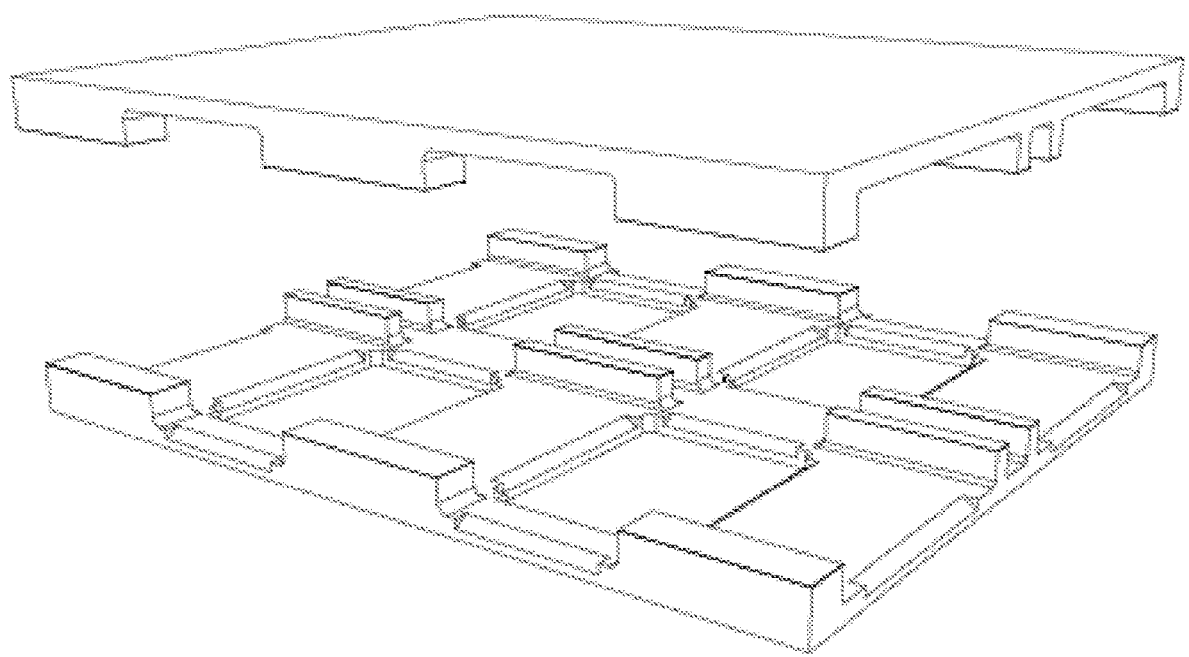
FIG. 5 is a 3D image of pallet 400 that has been sliced at the vertical mid-plane, Section C-C in FIG. 4, with the upper half removed and above the lower half to further illustrate the various features described in FIG. 4 in accordance with an embodiment of the disclosure.

FIG. 5 is a 3D image of pallet 400 that has been sliced at the vertical mid-plane, Section C-C in FIG. 4, with the upper half removed and above the lower half to further illustrate the various features described in FIG. 4 in accordance with an embodiment of the disclosure.

Figure 6:
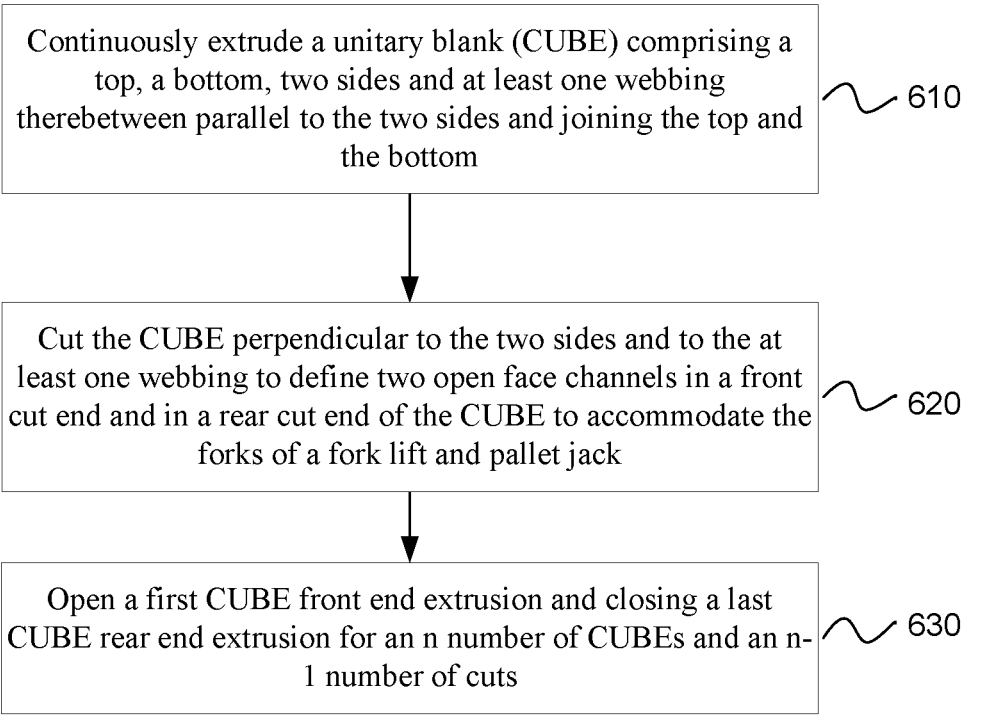
FIG. 6 depicts a flow chart of a method for making the disclosed pallet in accordance with an embodiment of the disclosure.

FIG. 6 depicts a flow chart of a method for making the disclosed pallet in accordance with an embodiment of the disclosure. The method includes 610 continuously extruding a unitary blank (CUBE) comprising a top, a bottom, two sides and at least one webbing there between parallel to the two sides and joining the top and the bottom. The method also includes 620 cutting the CUBE perpendicular to the two sides and to the at least one webbing to define two open face channels in a front cut end and in a rear cut end of the CUBE to accommodate the forks. The method additionally includes 630 opening a first CUBE front end extrusion and closing a last CUBE rear end extrusion for an n number of CUBEs and an n-1 number of cuts. The method further includes 640 cutting the CUBE to a predetermined length 'on the fly,' with no interruption or change to a constant speed of the CUBE as it leaves an extruder.

Figure 7:
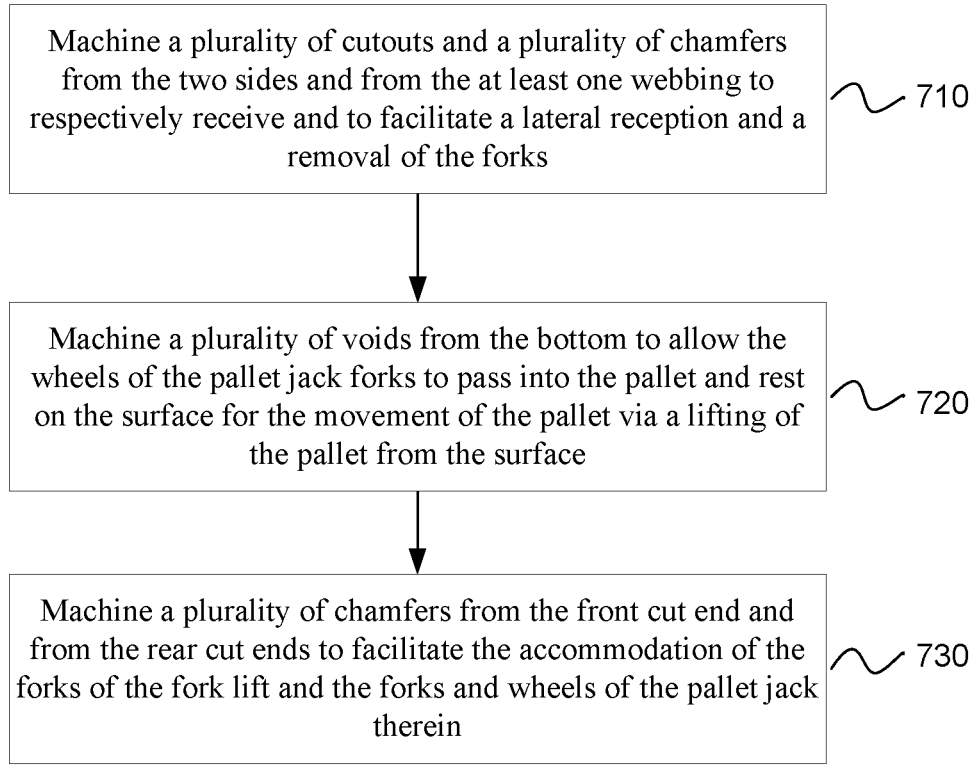
FIG. 7 depicts a flow chart of a method of making and machining the disclosed pallet in accordance with an embodiment of the disclosure.

FIG. 7 depicts a flow chart of a method of making and machining the disclosed pallet in accordance with an embodiment of the disclosure. Embodiments of the method include 710 machining a plurality of cutouts and chamfers from the two sides and from the at least one webbing to respectively receive and to facilitate a lateral reception and a removal of the forks. Embodiments also include 720 machining a plurality of voids from the bottom to allow the wheels of the pallet jack forks to pass into the pallet and rest on the surface for the movement of the pallet via a lifting of the pallet from the surface. A plurality of chamfers are also 730 machined from the front cut end and from the rear cut ends to facilitate the accommodation of the forks of the fork lift and the forks and wheels of the pallet jack therein.

In an embodiment, a blowing agent or blowing a gas into a continuously extruding polymer produces the CUBE having a cross section across any two material points thereof defining a plurality of random and gas filled closed mini cells sharing walls between adjacent cells.

A surface ribbing in the top and the bottom is added via a ribbing pattern in an extrusion die for the CUBE to increase a friction grip of the pallet top and the pallet bottom with a respective load and with the surface. A front end of a first CUBE precludes a cut thereto and finishing a rear end of a last CUBE precludes a cut thereto.

Figure 8:
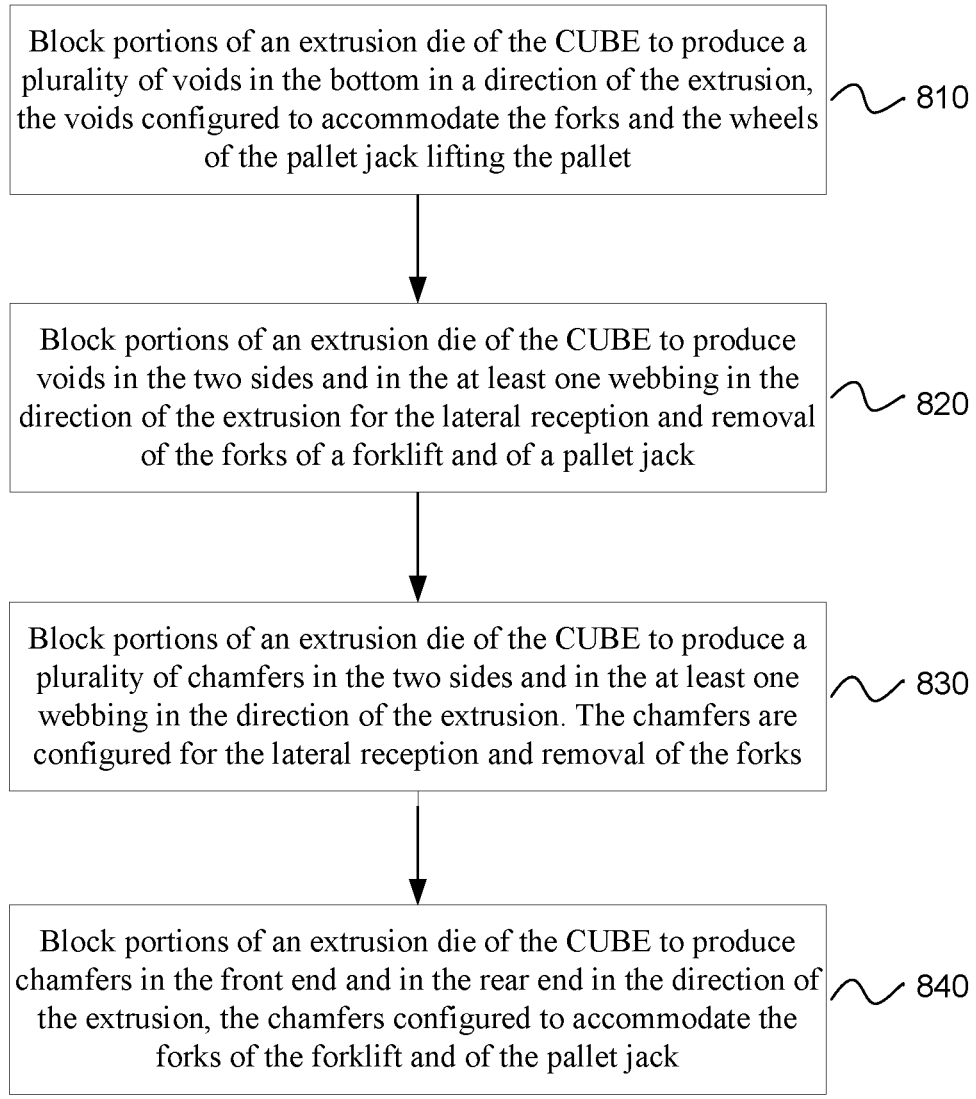
FIG. 8 depicts a flow chart of a method of making and extruding the pallet in accordance with an embodiment of the disclosure.

FIG. 8 depicts a flow chart of a method of making and extruding the pallet in accordance with an embodiment of the disclosure. Additional embodiments of the method of making the pallet of the disclosure further include temporally blocking 810 portions of an extrusion die of the CUBE to produce a plurality of voids in the bottom in a direction of the extrusion, the voids configured to accommodate the forks and the wheels of the pallet jack lifting the pallet. Temporally blocking 820 portions of an extrusion die of the CUBE also produce voids in the two sides and in the at least one webbing in the direction of the extrusion. Such voids are configured for the lateral reception and removal of the forks of a forklift and of a pallet jack. Also temporally blocking 830 portions of an extrusion die of the CUBE produces a plurality of chamfers in the two sides and in the at least one webbing in the direction of the extrusion. The chamfers are configured for the lateral reception and removal of the forks.

Further embodiments include 840 temporally blocking portions of an extrusion die of the CUBE to produce chamfers in the front end and in the rear end in the direction of the extrusion, the chamfers configured to accommodate the forks of the forklift and of the pallet jack.

Figure 9:
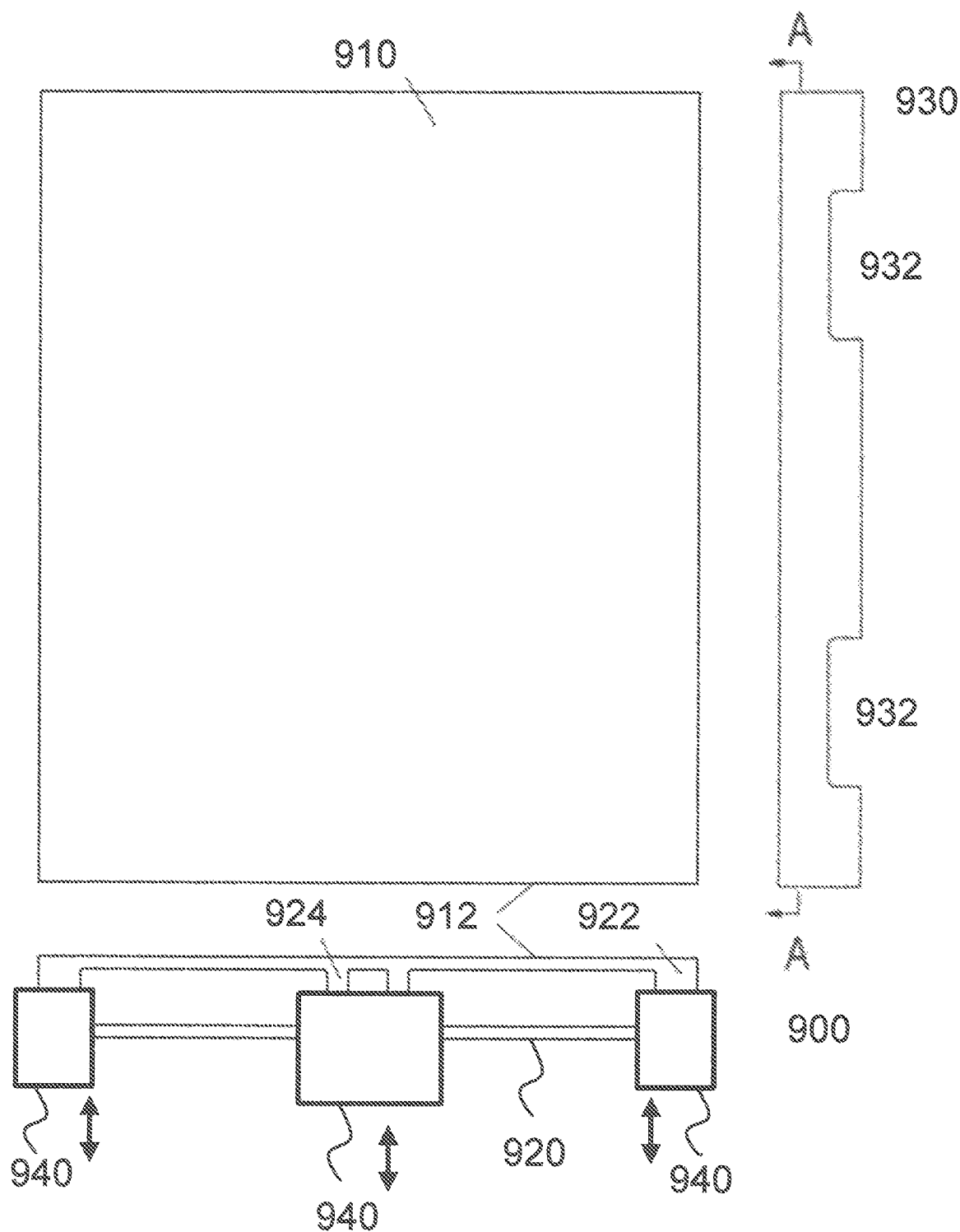
FIG. 9 depicts temporally blocking a portion of an extrusion die to form voids in the sides and in the webbing of the pallet in accordance with an embodiment of the disclosure.

FIG. 9 depicts temporally blocking a portion of an extrusion die to form voids in the sides and in the webbing of the pallet in accordance with an embodiment of the disclosure. The extruder die 920 indicates openings in the die which also matches the end profile of the die. Section view A-A of side 930 and end 920 of pallet 900 reveal upper interior details of pallet 900 after it has been extruded. Section A-A is located above the cut outs 932 as seen in the side view 930 and below the top deck 910 as seen in the end view 920. Cut outs 932 are fully through both vertical side members 922 and both vertical interior members 924. Cut outs 932 allow fork lift and pallet jack access from the side, fully across the width of the pallet and perpendicular to the major axis. The upper leading edge or face 912 of pallet 900 is differentiated from the bottom leading edge. Die extrusion blocks 940 move up and down and even sideways into and out of the extrusion flow producing the voids 932. The extrusion blocks 940 move up and down in time as the extrusion flow continues in time and may totally block a portion of the die and also be totally absent from blocking extrusion flow.

Figure 10:
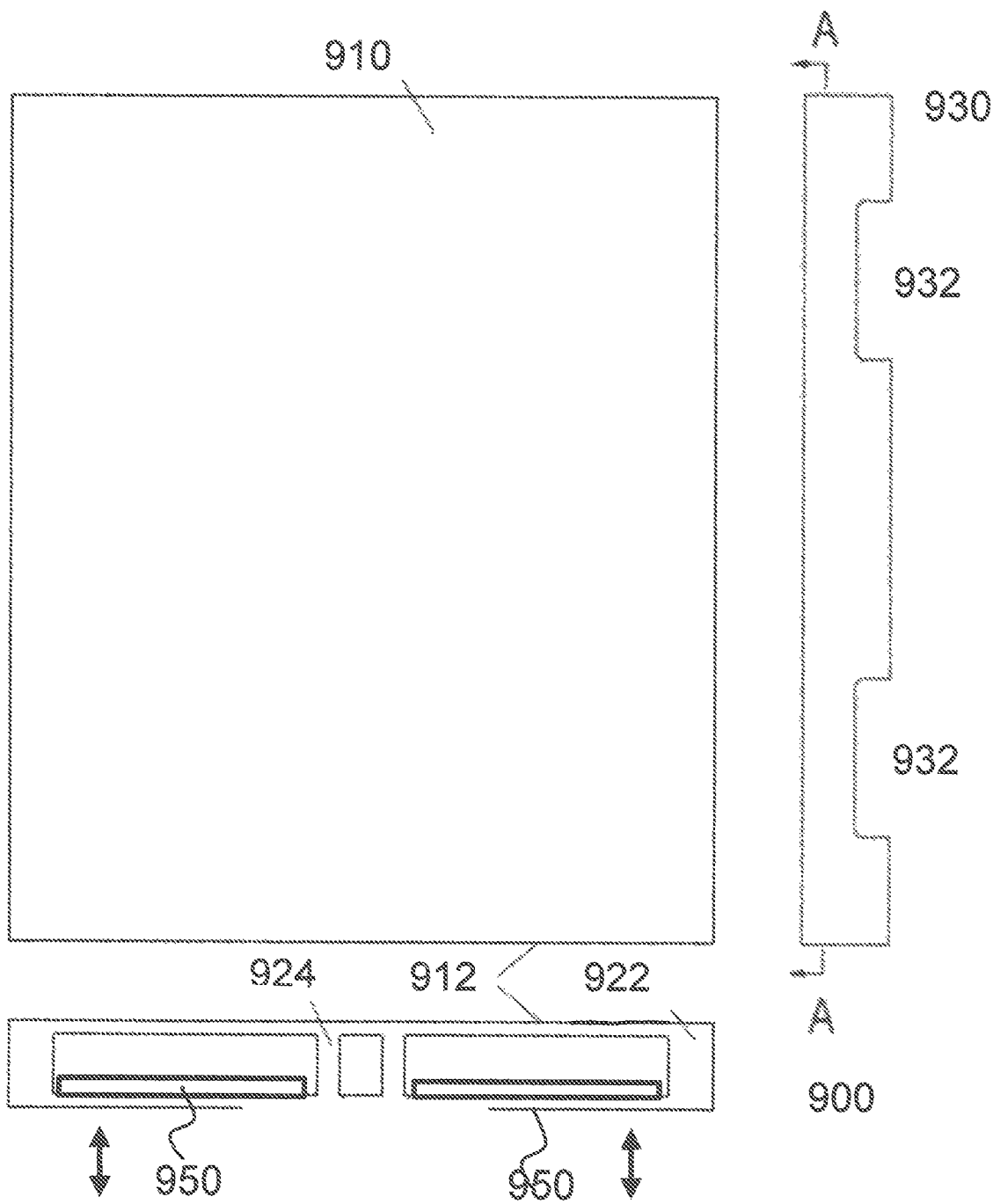
FIG. 10 depicts temporally blocking a portion of an extrusion die to form chamfers in the front cut end and in the rear cut end in accordance with an embodiment of the disclosure.

FIG. 10 depicts temporally blocking a portion of an extrusion die to form chamfers in the front cut end and in the rear cut end in accordance with an embodiment of the disclosure. Similar reference numbers are used for FIG. 10 as for FIG. 9 indicating same or similar features. Bottom boards 914 have chamfers to facilitate insertion of wheeled pallet jacks into the vertical spaces or voids (not shown) between the top deck and bottom boards. Fork lifts also use vertical spaces or voids for lifting pallet 900. Die extrusion blocks 950 move up and down and even sideways into and out of the extrusion flow producing the chamfers on the front and rear 'boards' similar to the boards 214 and chamfers 228 of FIG. 2. The extrusion blocks 950 move up and down in time as the extrusion flow continues in time and may totally block a portion of the die and also be totally absent from blocking extrusion flow.

Although the components herein are shown and described in a particular order, the order thereof may be altered so that certain advantages or characteristics may be optimized. In another embodiment, instructions or sub-operations of distinct steps may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents.

What is claimed is:

1. A pallet configured to accommodate forks of a fork lift and forks and wheels of a pallet jack for a movement of the pallet on a surface, the pallet comprising:
   a continuous unitary extrusion blank (CUBE) comprising a top, a bottom, two sides and a dual webbing there between parallel to the two sides and joining the top and the bottom;
   a front cut end and a rear cut end configured by a cut of the CUBE perpendicular to the two sides, wherein a first CUBE comprises a front cut end and a last CUBE comprises a rear cut end; and
   a plurality of CUBE surfaces and geometries cutout and chamfered by machining to form a finished pallet.

2. The pallet of claim 1, further comprising a plurality of cutouts machined from the two sides and from the at least one webbing to accept a lateral insertion and a lateral removal of the forks therefrom.

3. The pallet of claim 2, further comprising a plurality of chamfers machined from a plurality of edges of the cutouts to facilitate the insertion and the removal of the forks of the fork lift and forks and wheels of the pallet jack therefrom.

4. The pallet of claim 1, further comprising a plurality of chamfers machined from the front cut end and from the rear cut ends to facilitate the accommodation of the forks of the fork lift and the forks and wheels of the pallet jack therein.

5. The pallet of claim 1, further comprising a plurality of voids machined from the bottom to allow the wheels of the pallet jack to pass into the pallet and rest on the surface for the movement of the pallet via a lifting of the pallet from the surface.

6. The pallet of claim 1, wherein a cross section of the CUBE across any two material points thereof defines a plurality of random and gas filled closed mini cells sharing walls between adjacent cells.

7. A method of making a pallet configured to accommodate forks of a fork lift and forks and wheels of a pallet jack for a movement of the pallet on a surface, the pallet comprising:
- continuously extruding a unitary blank (CUBE) comprising a top, a bottom, two sides and a dual webbing there between parallel to the two sides and joining the top and the bottom;
- cutting the CUBE perpendicular to the two sides and to the at least one webbing to define two open face channels in a front face and in a rear face of the CUBE to accommodate the forks; and
- blocking a plurality of cutouts and a plurality of chamfers in a plurality of CUBE edges and geometries to form a finished pallet.

8. The method of making the pallet of claim 7, further comprising cutting the CUBE to a predetermined length 'on the fly,' with no interruption or change to a constant speed of the CUBE as it leaves an extruder.

9. The method of making the pallet of claim 7, further comprising machining a plurality of cutouts and a plurality of chamfers from the two sides and from the dual webbing to respectively receive and to facilitate a lateral reception and a removal of the forks.

10. The method of making the pallet of claim 7, further comprising machining a plurality of voids from the bottom to allow the wheels of the pallet jack forks to pass into the pallet and rest on the surface for the movement of the pallet via a lifting of the pallet from the surface.

11. The method of making the pallet of claim 7, further comprising machining a plurality of chamfers from the front cut end and from the rear cut ends to facilitate the accommodation of the forks of the fork lift and the forks and wheels of the pallet jack therein.

12. The method of making the pallet of claim 7, further comprising disposing a blowing agent or blowing a gas into a continuously extruding polymer to produce the CUBE having a cross section across any two material points thereof defining a plurality of random and gas filled closed mini cells sharing walls between adjacent cells.

13. The method of making the pallet of claim 7, extruding a surface ribbing in the top and the bottom via a ribbing pattern in an extrusion die for the CUBE to increase a friction grip of the pallet top and the pallet bottom with a respective load and with the surface.

14. The method of making the pallet of claim 7, further comprising a front unblocked die extrusion of a first CUBE end that precludes a cut thereto and finishing a rear blocked die extrusion of a last CUBE end that precludes a cut thereto.

15. The method of making the pallet of claim 7, further comprising blocking portions of an extrusion die of the CUBE to produce a plurality of voids in the bottom in a direction of the extrusion, the voids configured to accommodate the forks and the wheels of the pallet jack lifting the pallet.

16. The method of making the pallet of claim 7, further comprising blocking portions of an extrusion die of the CUBE to produce a plurality of voids in the two sides and in the at least one webbing in the direction of the extrusion, the voids configured for the lateral reception and removal of the forks.

17. The method of making the pallet of claim 7, further comprising blocking portions of an extrusion die of the CUBE to produce a plurality of chamfers in the two sides and in the at least one webbing in the direction of the extrusion, the chamfers configured for the lateral reception and removal of the forks.

18. The method of making the pallet of claim 7, further comprising blocking portions of an extrusion die of the CUBE to produce a plurality of chamfers in the front end and in the rear end in the direction of the extrusion, the chamfers configured to accommodate the forks.

19. A pallet configured to accommodate forks of a fork lift and forks and wheels of a pallet jack for a movement of the pallet on a surface, the pallet comprising:
- a continuously extruding a unitary blank (CUBE) comprising a top, a bottom, two sides and a dual webbing there between parallel to the two sides and joining the top and the bottom,
- wherein perpendicular to the two sides and to the at least one webbing the CUBE has a front end and a rear end which define two open face channels therein to accommodate the forks;
- a plurality of spaces manufactured in the two sides and in the at least one webbing to accept a lateral insertion and a lateral removal of the forks therefrom;
- a plurality of chamfers manufactured in a plurality of edges of the cutouts to facilitate the insertion and the removal of the forks therefrom;
- a plurality of chamfers manufactured in the front cut end and in the rear cut ends to facilitate the accommodation of the forks therein; and
- a plurality of voids manufactured in the bottom to allow the wheels of the forks to pass into the pallet and rest on the surface for the movement of the pallet via a lifting of the pallet from the surface.

* * * * *